US010030520B2

(12) United States Patent
Duchene et al.

(10) Patent No.: US 10,030,520 B2
(45) Date of Patent: Jul. 24, 2018

(54) BLADE FOR A WATER CURRENT TURBINE ROTOR, WATER CURRENT TURBINE COMPRISING SUCH A BLADE, ASSOCIATED WATER CURRENT TURBINE AND METHOD FOR PRODUCING SUCH A BLADE

(71) Applicant: GE Energy Power Conversion Technology Ltd, Warwickshire (GB)

(72) Inventors: Hugo Duchene, Nancy (FR); Philippe Cagnin, Champigneulles (FR); Antoine Girard-Pecarrere, La Rochelle (FR)

(73) Assignee: GE ENERGY POWER CONVERSION TECHNOLOGY LTD, Warwickshire (GB)

(*) Notice: Subject to any disclaimer, the term of this patent is extended or adjusted under 35 U.S.C. 154(b) by 494 days.

(21) Appl. No.: 14/374,582

(22) PCT Filed: Jan. 24, 2013

(86) PCT No.: PCT/EP2013/051365
§ 371 (c)(1),
(2) Date: Jul. 25, 2014

(87) PCT Pub. No.: WO2013/110721
PCT Pub. Date: Aug. 1, 2013

(65) Prior Publication Data
US 2014/0369841 A1 Dec. 18, 2014

(30) Foreign Application Priority Data

Jan. 27, 2012 (FR) ..................................... 12 50809

(51) Int. Cl.
*F01D 5/14* (2006.01)
*F03B 17/06* (2006.01)
(Continued)

(52) U.S. Cl.
CPC ............. *F01D 5/142* (2013.01); *F01D 5/147* (2013.01); *F03B 3/121* (2013.01); *F03B 3/126* (2013.01);
(Continued)

(58) Field of Classification Search
CPC . Y02E 10/223; Y02E 10/28; F05B 2240/301; F05B 2240/302;
(Continued)

(56) References Cited

U.S. PATENT DOCUMENTS 1,606,887 A * 11/1926 Moody ..................... F03B 3/12
415/117
1,833,529 A * 11/1931 Moody ................... F03B 3/121
415/217.1
(Continued)

FOREIGN PATENT DOCUMENTS

CN 1636111 A 7/2005
CN 1809695 A 7/2006
(Continued)

OTHER PUBLICATIONS

Peng, "Numerical Simulation of The Unsteady Flow Field of Gas Turbine Rotor Blade Guides and Interaction", Turbine Technology, Feb. 25, 2008, pp. 26-28, vol. No. 50, Issue No. 1.
(Continued)

Primary Examiner — Logan Kraft
Assistant Examiner — Joshua R Beebe
(74) Attorney, Agent, or Firm — GE Global Patent Operation; Scott R. Stanley

(57) ABSTRACT

A blade for a water current turbine rotor, which extends along a radial direction and comprises an outer surface, an inner surface, a leading edge, and a trailing edge. The leading edge is the edge of the blade that extends along the radial direction and is disposed upstream in the direction in which the water flows along the blade, while the trailing edge is the edge of the blade opposite the leading edge and
(Continued)

is disposed downstream in the direction of flow. At least one portion of the blade has a profile comprising a thick portion and a thin portion, the cross section being perpendicular to the radial direction. The thick portion and the thin portion each have a maximum thickness along a direction perpendicular to the outer surface, the maximum thickness of the thick portion being at least four times greater than the maximum thickness of the thin portion.

12 Claims, 5 Drawing Sheets

(51) Int. Cl.
- *F03B 3/12* (2006.01)
- *F03B 13/26* (2006.01)
- *F03B 13/10* (2006.01)

(52) U.S. Cl.
CPC ............ *F03B 13/10* (2013.01); *F03B 13/264* (2013.01); *F03B 17/061* (2013.01); F05B 2240/301 (2013.01); F05B 2240/97 (2013.01); F05B 2280/1021 (2013.01); F05B 2280/4009 (2013.01); Y02E 10/223 (2013.01); Y02E 10/28 (2013.01); Y02P 70/525 (2015.11); Y02P 70/527 (2015.11); Y10T 29/49336 (2015.01)

(58) Field of Classification Search
CPC ............ F05B 2250/713; F05B 2240/97; F05B 2280/1021; F05B 2280/4009; F01D 5/14; F01D 5/141; F01D 5/145; F01D 5/147; F01D 5/142; F03B 3/121; F03B 3/126; F03B 13/10; F03B 13/264; F03B 17/061; Y02P 70/525; Y02P 70/527; Y02T 29/49; Y02T 29/336

See application file for complete search history.

(56) References Cited

U.S. PATENT DOCUMENTS

| | | | | |
|---|---|---|---|---|
| 1,857,509 A * | 5/1932 | Holmstrom | | B63H 1/16 415/115 |
| 2,068,792 A * | 1/1937 | Dekker | | B64C 11/00 416/202 |
| 2,157,999 A * | 5/1939 | Charavay | | F04D 29/384 416/242 |
| 2,357,628 A * | 9/1944 | Boerger | | F03B 3/121 29/889.72 |
| 4,293,280 A * | 10/1981 | Yim | | B63H 1/26 416/175 |
| 4,692,098 A * | 9/1987 | Razinsky | | F04D 29/384 415/914 |
| 4,913,670 A * | 4/1990 | Spranger | | B63B 3/38 416/231 B |
| 5,151,014 A * | 9/1992 | Greenwald | | B64C 3/58 416/237 |
| 5,226,804 A * | 7/1993 | Do | | F03B 3/121 416/223 R |
| 5,624,234 A * | 4/1997 | Neely | | F04D 29/326 416/189 |
| 6,467,422 B1 * | 10/2002 | Elms | | B63B 1/248 114/274 |
| 7,278,825 B2 * | 10/2007 | Segota | | B63B 1/248 244/130 |
| 7,471,009 B2 | 12/2008 | Davis et al. | | |
| 2003/0193198 A1 * | 10/2003 | Wobben | | F03B 13/264 290/54 |
| 2007/0224029 A1 * | 9/2007 | Yokoi | | F03D 3/005 415/4.2 |

FOREIGN PATENT DOCUMENTS

| | | |
|---|---|---|
| JP | 2008180130 | 8/2008 |
| WO | 2004113717 A1 | 12/2004 |

OTHER PUBLICATIONS

Unofficial English Translation of Chinese Office Action issued in connection with corresponding CN Application No. 201380006693.9 dated Jan. 26, 2016.

International Search Report dated Jun. 27, 2013 which was issued in connection with PCT Patent Application No. PCT/EP2013/051365 which was filed on Jan. 24, 2013.

* cited by examiner

BLADE FOR A WATER CURRENT TURBINE ROTOR, WATER CURRENT TURBINE COMPRISING SUCH A BLADE, ASSOCIATED WATER CURRENT TURBINE AND METHOD FOR PRODUCING SUCH A BLADE

BACKGROUND

Field of the Invention

Embodiments of the present invention relate to a blade for a marine turbine rotor.

Embodiments of the present invention also relate to a marine turbine rotor, with the rotor comprising an inner ring, an outer ring and at least one such blade extending in radial direction between the inner ring and the outer ring.

Embodiments of the present invention also relate to a marine turbine comprising a stator and such rotor.

Embodiments of the present invention also relate to a procedure for manufacturing such blade for a marine turbine rotor.

Description of Related Art

A blade for a marine turbine rotor of the aforementioned type is known to exist. The known blades present generally two profile types. In the first type, the profile comprises essentially the thick part, and the curvilinear length of the thin part is, therefore, close to zero. In the second type, the profile comprises essentially the thin part, and the curvilinear length of the thin part is, therefore, greater than the length of the cord between the leading edge and the trailing edge.

However, a marine turbine equipped with the first type of blade, with the profile comprising essentially the thick part, provides good output for relatively low rotation speeds. A marine turbine equipped with the second type of blade, with the profile comprising essentially the thin part, provides good output for relatively high rotation speeds, higher than those associated with the first type of blade.

Therefore, the objective of the invention is to propose a blade for a marine turbine rotor, which offers higher output in a wider range of rotation speeds of the marine turbine rotor for both low and high speeds, such as speeds between 20 and 40 revolutions per minute, inclusive.

BRIEF SUMMARY OF THE INVENTION

To this effect, embodiments of the present invention provide a blade of the aforementioned type, characterised in that the curvilinear length of the thin part is between 0.1 times the length of the cord between the leading edge and the trailing edge and 0.9 times the length of the said cord, inclusive, preferably between 0.25 times the length of the said cord and 0.9 times the length of the said cord, inclusive.

According to an embodiment of the present invention, there is provided a blade for a marine turbine rotor, with the blade extending in a radial direction and comprising an outer surface, an inner surface, a leading edge and a trailing edge, the leading edge being the edge of the blade extending generally in the radial direction and positioned upstream following the direction of the water flowing lengthwise along the blade, the trailing edge being the edge of the blade opposite the leading edge and positioned downstream following the direction of the water flowing lengthwise along the blade, with at least one portion of the blade presenting, in the transverse section according to a cut plane, a profile comprising a thick part and a thin part, the cut plane being perpendicular to the radial direction, the thick part and the thin part having each a maximum thickness in the direction that is perpendicular to the outer curve, the maximum thickness of the thick part being at least four times larger that the maximum thickness of the thin part.

Following other embodiments, the blade comprises one or several of the following characteristics, taken in isolation or following all the technically possible combinations: the maximum thickness of the thick part is less than or equal to 0.25 times the length of the cord between the leading edge and the trailing edge, the entire blade presents the thick part and the thin part independently of the radial direction of the cut plane, the blade presents the same profile independently of the position in the radial direction of the cut plane, the length of the cord between the leading edge and the trailing edge has a variable value depending on the position in the radial direction of the cut plane, preferably of decreasing value from the inner ring towards the outer ring, the profile presents, on the side of the inner surface, an inflexion point, and the thick part presents a plane of symmetry, with the plane of symmetry being parallel to the radial direction.

An embodiment also includes a marine turbine rotor, with the rotor comprising an inner ring, an outer ring and at least one blade extending itself in radial direction between the inner ring and the outer ring, characterised in that the blade is the one that has been defined above.

An embodiment also includes a marine turbine comprising a rotor and a stator, characterised in that the rotor is the one that has been defined above.

An embodiment also includes a procedure for manufacturing a blade of a marine turbine rotor, with the blade extending in radial direction and comprising an outer surface, an inner surface, a leading edge and a trailing edge, with the leading edge being the edge of the blade extending generally in the radial direction and positioned upstream following the direction of the water flowing along the blade, the trailing edge being the edge of the blade opposite the leading edge and positioned downstream following the direction of the water flowing along the blade, the manufacturing procedure includes the following steps: the calculation, for every point of the leading edge, of a profile of the blade, in transverse section according to a cut plane passing through the point of the leading edge and perpendicular to the radial direction, the manufacturing of the blade according to the calculated profiles. The manufacturing procedure is characterised by the calculation step, consisting of: the choice of a first intermediate point along a predetermined curve of the outer surface, the first intermediate point being distinct from the first and second ends of the curve of the outer surface, the determination of a first portion of the curve of the inner surface, using a symmetry calculation, with respect to a straight line passing through the first intermediate point and a first end of the curve of the outer surface, of the portion of the curve of the outer surface taken between the first end and the first intermediate point, the deletion of a section of the first portion of the curve of the inner surface taken between the first intermediate point and a second intermediate point positioned alongside the first portion in order to obtain a first shortened portion, and the determination of a second portion of the curve of the inner surface by connecting the second intermediate point to the second end via a geometric line, the first shortened portion and the second portion forming a curve of the inner surface and the profile formed by the curve of the outer surface and the curve of the inner surface.

Following another beneficial aspect of the invention, the manufacturing procedure includes the following characteristic: the step for determining the second portion comprises a non-uniform translation of the portion of the curve of the outer surface taken between the second end and the first intermediate point, the distance of the translation being variable from one point of the portion to the other, preferably increasing from the point to be translated, corresponding to the second end, to the point to be translated, corresponding to the first intermediate point.

BRIEF DESCRIPTION OF THE DRAWINGS

These characteristics and advantages of the invention will become apparent when reading the description that follows, which is provided solely as a non-exhaustive example, and refers to the attached drawings, of which.

DETAILED DESCRIPTION OF THE INVENTION

Figure 1:
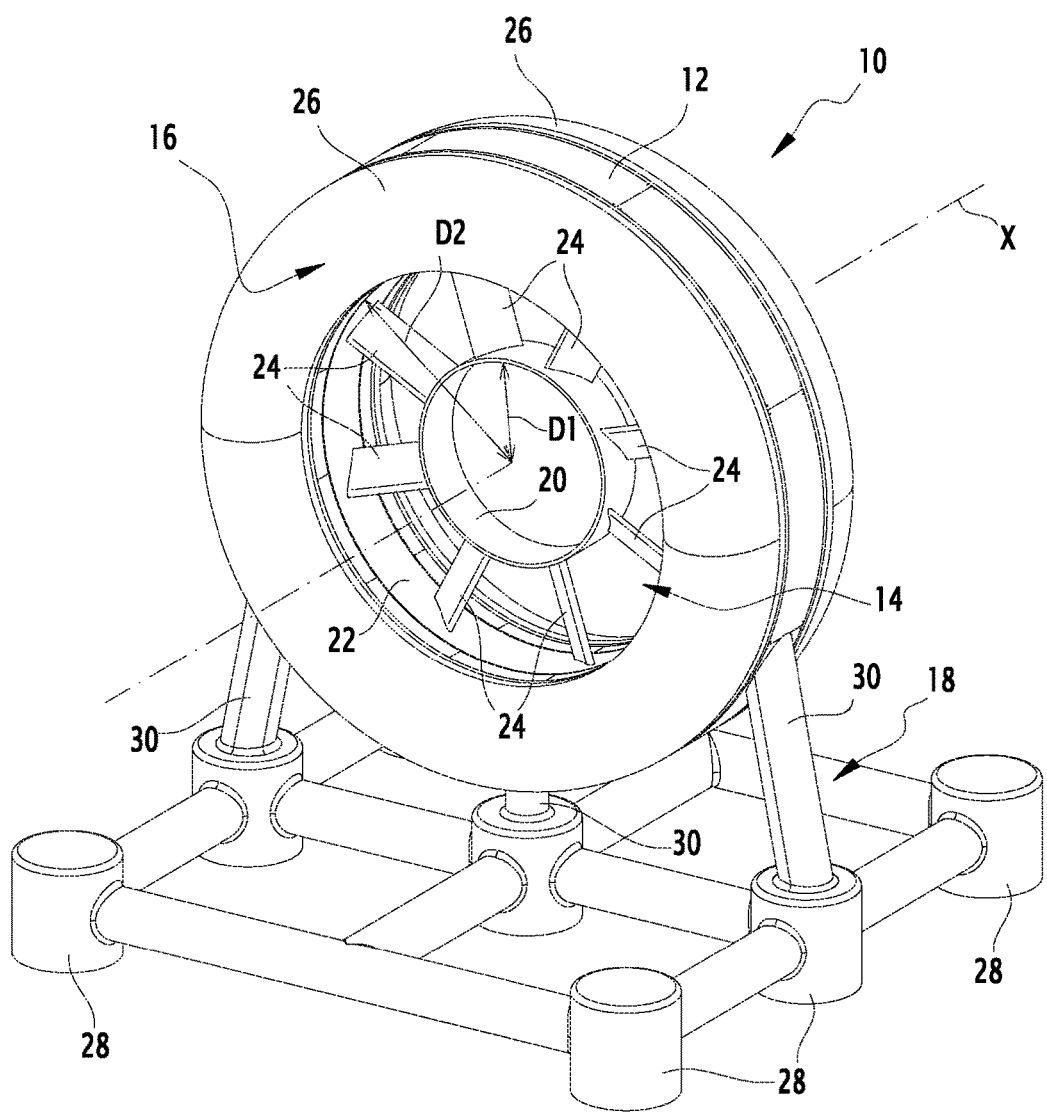
FIG. 1 is a perspective view of a marine turbine in accordance with the invention.

In FIG. 1, a marine turbine 10 comprises a stator 12, a mobile rotor 14 rotating around a longitudinal axis X, and a duct 16. The marine turbine 10 also comprises a support 18 for supporting the stator.

The marine turbine 10 is capable of transforming the kinetic energy of a flow of a liquid, circulating inside the duct 16 in the longitudinal direction X, into electric energy, with the current driving the rotor 14 in rotation around the axis X, and the rotation of the rotor 14 with respect to the stator 12 generating electric energy.

The marine turbine 10 is, for example, an underwater marine turbine designed to use the kinetic energy of the sea currents. In another variant, the marine turbine is designed to be immersed in a water course in order to convert the hydraulic energy of the water course into electric energy.

The stator 12 is in the form of a ring revolving around the longitudinal axis X. The stator 12 comprises, as known, active magnetic parts of the stator which are not shown.

The rotor 14 comprises an inner ring 20, an outer ring 22 and multiple blades 24 extended along the radial direction R, perpendicular to the longitudinal axis X, between the inner ring 20 and the outer ring 22. The number N of blades 24 is preferably between 2 and 20, inclusive.

In the embodiment example in FIG. 1, the rotor 14 comprises eight blades distributed at an angle on the outside periphery of the inner ring 20, and N is equal to 8. Or, in other words, the angular spacing between two successive blades is roughly equal to 45°.

The rotor 14 also comprises the magnetic parts of the rotor, not shown, which are arranged on the outside periphery of the outer ring 22 and are capable of working with the active magnetic parts of the stator in order to generate electric energy whilst the rotor 14 is rotating around the axis X, inside the stator 12.

The duct 16 comprises two half-ducts 26 fitted on all sides of the stator 12 in the longitudinal direction X. The duct 16 is in the form of a ring torus around the longitudinal axis X, the torus presenting a transverse section with oblong form. Every half-duct 26 has, in a cross-section following a longitudinal plane parallel to the axis X, a U form, with the two ends of the U being fixed to the stator 12.

The support 18 comprises multiple support points 28 for support on the floor and three vertical arms 30 for maintaining the stator at a distance from the floor. The support 18 comprises, for example, a tubular chassis.

The inner ring 20 and the outer ring 22 are each in the form of a cylindrical tube revolving around the longitudinal axis X. The length of the inner ring 20 and the length of the outer ring 22 in the longitudinal direction X are, for example, approximately the same. In a variant, the length of the inner ring 20 and the length of the outer ring 22 in the longitudinal direction X are different.

The inner ring 20 presents a first diameter D1 in the plane that is perpendicular to the axis X, and the outer ring 22 presents a second diameter D2 that is greater than the first diameter D1. The size of the first diameter D1 is, for example, between 2,000 mm and 8,000 mm inclusive. The size of the second diameter D2 is, for example, between 4,000 mm and 18,000 mm inclusive.

Figure 2:
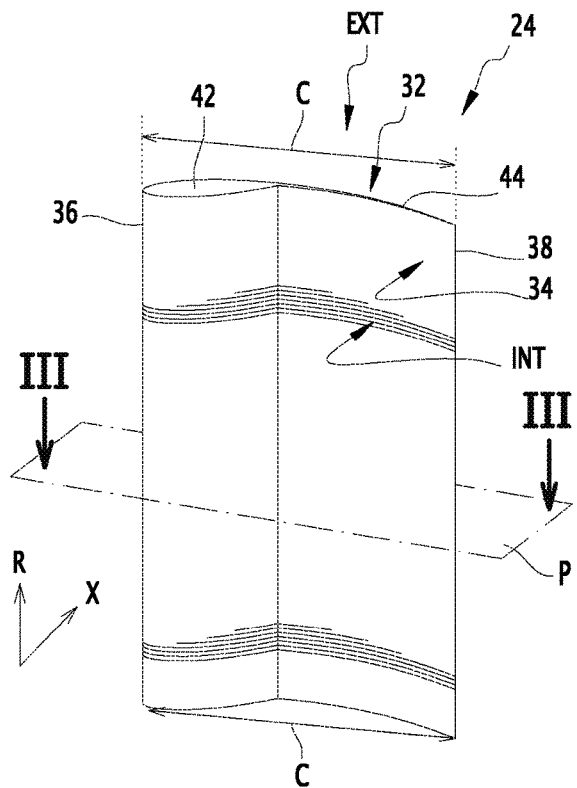
FIG. 2 is a schematic diagram of one marine turbine blade from FIG. 1, according to a first mode of embodiment of the invention.

Each blade 24 comprises a first face 32, a second face 34, a leading edge 36 and a trailing edge 38, as shown in FIG. 2. Following a first direction of the water current in the longitudinal direction X, the first face 32 corresponds to the outer surface EXT and the second face 34 corresponds to the inner surface INT, the inner surface INT being the face of the blade 24 subjected to the pressure of the water current and the outer surface EXT being the face of the blade 24 on the side opposite the inner surface INT. Following a second direction of the current, opposite to the first direction, the first face 32 corresponds to the inner surface INT and the second face 34 corresponds to the outer surface EXT. The leading edge 36 is the edge of the blade 24 extending in the radial direction R and positioned upstream in the direction of the water flowing along the blade 24. The trailing edge 38 is the edge of the blade 24 opposite the leading edge 36 and positioned downstream in the direction of the water flow. Or, in other words, the leading edge 36 meets the water flow, and the trailing edge 38 corresponds to the rear part of the blade 24 in the direction of the water flow.

At least one portion of the blade 24 in the radial direction R presents, in a transverse section along a cut plane P perpendicular to the radial direction R, a profile 40 comprising one thick part 42 and one thin part 44.

Figure 3:
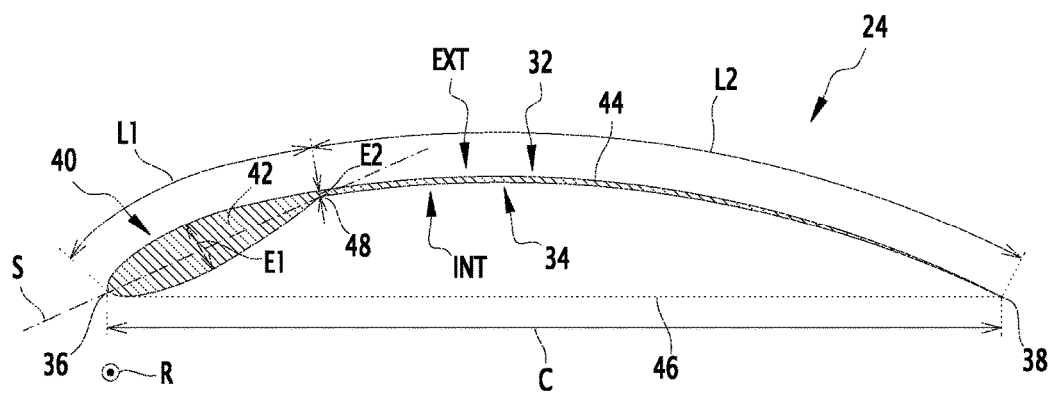
FIG. 3 is a sectional view along plane III of FIG. 2.

The leading edge 36 and the trailing edge 38 are connected by a fictitious segment 46, shown in dotted lines in FIG. 3, also called cord, between the leading edge 36 and the trailing edge 38.

The profile 40 presents, on the side of the inner surface INT, an inflexion point 48.

The thick part 42 has a maximum thickness of E1 in a direction that is perpendicular to the outer surface EXT and presents a first curved line length L1 on the side of the outer surface EXT, as shown in FIG. 3.

The thick part 42 presents a plane of symmetry S, visible in FIG. 3, with the plane of symmetry S being parallel to the radial direction R. The thick part 42 is, for example, made of a metal material such as aluminium.

The thin part 44 has a second maximum thickness E2 in a direction that is perpendicular to the outer surface EXT and presents a second curved line length L2 on the side of the outer surface EXT. The thin part 44 is, for example, made of a composite material, or sheet metal, or also of polyetheretherketone, known also as PEEK (from English PolyEtherEtherKetone).

In a variant, the thick part 42 and the thin part 44 are made of a thermoplastic or thermosetting material. In yet another variant, the thick part 42 is made of a composite material.

The cord 46 between the leading edge and the trailing edge has a length C.

The inflexion point 48 corresponds approximately to the delimitation between the thick part 42 and the thin part 44.

The second length of the curved line L2 is between 0.1 times the length C of the cord 46 between the leading edge and the trailing edge and 0.9 times the length C of the said cord 46. The second length of the curved line L2 is preferably between 0.25 times the length C and 0.9 times the length C.

The first maximum thickness E1 is at least four times greater than the second maximum thickness E2. The first maximum thickness E1 is less than or equal to 0.25 times the length C of the cord between the leading edge 36 and the trailing edge 38.

In the embodiment example of FIG. 2, the entire blade 24 presents the thick part 42 and the thin part 44 independently of the position of the cut plane P in the radial direction R. The blade 24 presents, for example, the same profile 40 independently of the position of the cut plane P in the radial direction R.

The procedure for manufacturing the blade 24, according to the invention, will be described using FIG. 4.

Figure 5:
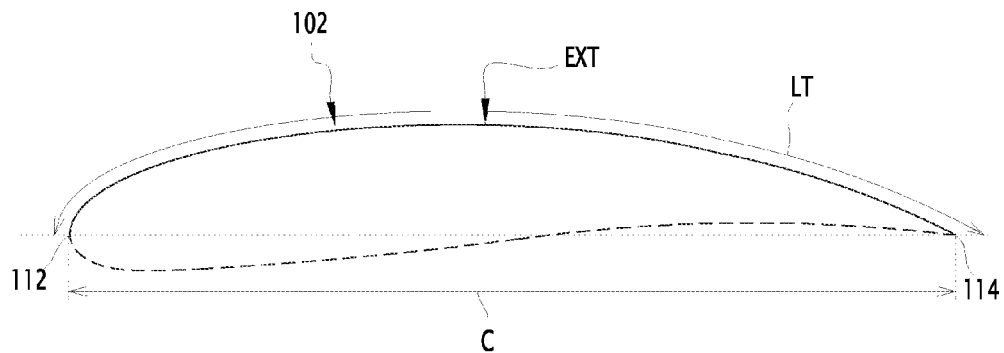

During the initial phase 100, a predetermined reference profile is selected. From this reference profile, a curve of the outer surface 102 is preserved, shown by a continuous line in FIG. 5. The selected profile has a total length of the curved line LT on the side of the outer surface EXT.

Figure 6:
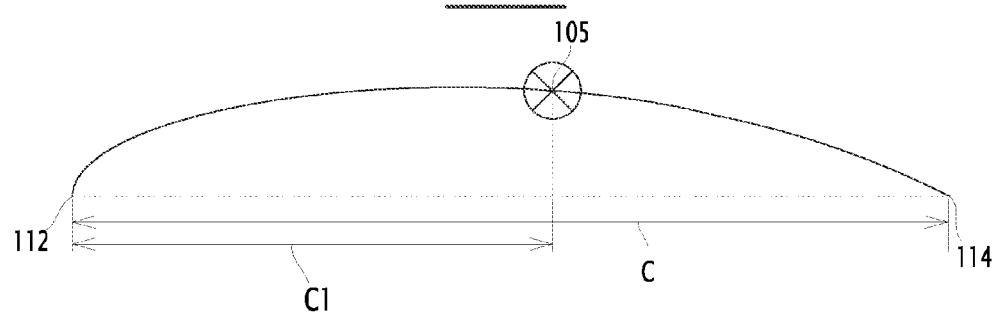

A first intermediate point 105 is thus selected, during the next step 110, along the predetermined curve of the outer surface 102, the first intermediate point 105 being distinct from the first 112 and the second 114 ends of the curve of the outer surface 102 (FIG. 6). A fictitious segment between, on the one hand, the first part 112 and, on the other hand, the orthogonal projection of the point of reference 105 on the cord between the first and second ends 112, 114, has a length C1 corresponding to a percentage of the length C of the cord. The length C1 is roughly between 10% and 90% of the length C, preferably between roughly 10% and 75% of the length C.

Figure 7:
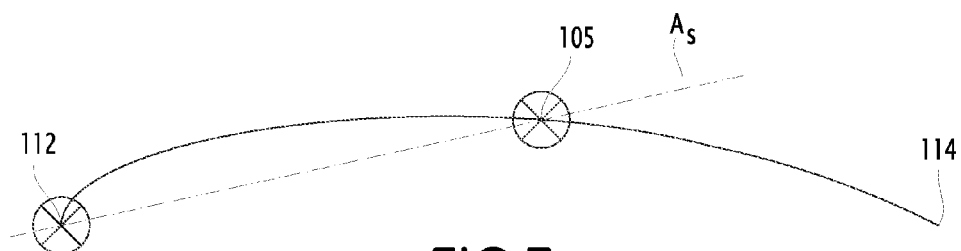

An axis of symmetry $A_S$ passing through the first end 112 of the curve of the outer surface and the first intermediate point 105 selected in advance and thus created during the step 120, as shown in FIG. 7.

Figure 8:
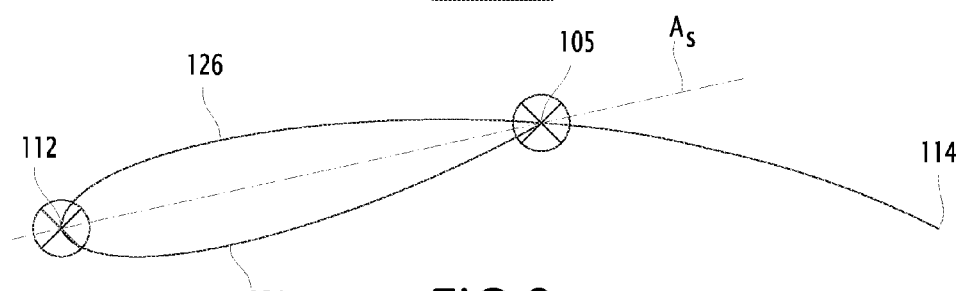

A first portion 124 of the curve of the inner surface is determined during step 130, by means of a symmetry calculation, with respect to the axis of symmetry $A_S$, from the portion 126 of the curve of the outer surface between the first end 112 and the first intermediate point 105 inclusive, as shown in FIG. 8.

Figure 9:
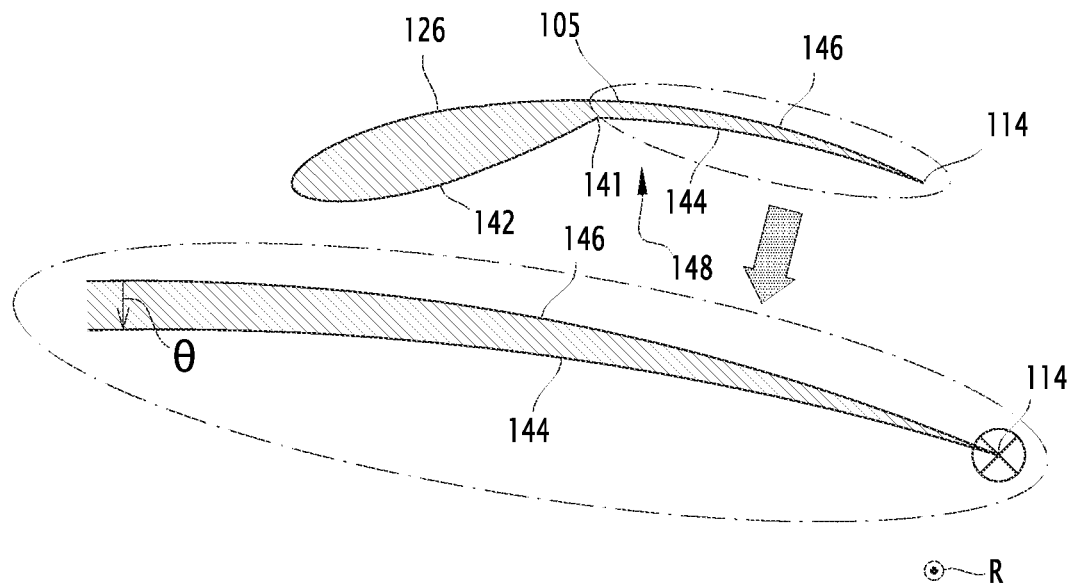

After this, the manufacturing procedure comprises, from step 135, the deletion of a section of the first portion 124 of the curve of the inner surface between the first intermediate point 105 and a second intermediate point 141 inclusive, arranged alongside the first portion 124, in order to obtain a shortened first portion 142 of the curve of the inner surface, shown in FIG. 9. The second intermediate point 141 forms one of the two ends of the first shortened portion 142, the other end of the first shortened portion 142 being the first end 112.

A second portion 144 of the curve of the inner surface is then determined during step 140, connecting the second intermediate point 141 to the second end 114 via a geometric line.

In the embodiment example of FIG. 9, the second portion 144 of the curve of the inner surface is determined by means of an operation of rotation, at a predetermined angle Θ around the second end 114, of the portion 146 of the curve of the outer surface 102 between the second end 114 and the first intermediate point 105 inclusive. The second portion 144 of the curve of the inner surface is then extended up to the second intermediate point 141.

In a variant that is not shown, the second portion 144 of the curve of the inner surface is determined by means of an operation of translation of the portion 146 of the curve of the outer surface 102 between the second end 114 and the first intermediate point 105 inclusive. The translation is, for example, a translation at a predetermined distance and following a direction that is perpendicular to the portion 146 at a point of the portion 146. In a variant, the translation is a non-uniform translation, the distance of the translation being variable from one point to the other of the portion 146, preferably increasing from the point to be translated corresponding to the second end 114 up to the point to be translated corresponding to the first intermediate point 105.

In yet another variant, the second portion 144 of the curve of the inner surface is in the form of a straight line between the second intermediate point 141 and the second end 114.

A curve of the inner surface 148, shown in FIG. 9, is formed from the first shortened portion 142 and the second portion 144. Thus the calculated profile is formed by the curve of the outer surface 102 and the curve of the inner surface 148.

And finally, the blade 24 is manufactured during step 150 following the profile calculated during the preceding steps 100 to 140, the blade having the same profile 40 as the position of the cut plane P in the radial direction R in the embodiment example of FIG. 2.

The operation of the marine turbine 10, according to the invention, will now be described.

When a flow of water circulates through the duct 16 in the longitudinal direction X, it exerts a pressure on the various blades 24 of the rotor, which drives the rotor 14 in rotation around the longitudinal axis X. The active magnetic parts of the rotor then begin to move in relation to the active magnetic parts of the stator, which generates a magnetic field and induces an electric current in the stator 12. The electric power thus generated by the marine turbine 10 from the hydraulic energy of the water currents is then transmitted to a power grid.

The marine turbine 10, which is fitted with the blade 24, according to the invention, enables the delivery of electric power greater than 100 kW for rotation speeds of the rotor 14, for example, between 20 and 40 revolutions per minute inclusive. In comparison, the state-of-the-art blades deliver electric power that is comparable only for a very reduced range of rotation speeds of the rotor, such as speeds between 25 and 35 revolutions per minute inclusive.

Therefore, the blade 24, in accordance with the invention, offers a higher output and helps to increase the electric power delivered by the marine turbine 10 for a wide range of rotation speeds of the rotor 14, such as speeds between 20 and 40 revolutions per minute inclusive.

The blade 24, in accordance with the invention, also offers a good compromise between the rigidity of its thick part 42 and the flexibility of its thin part 44.

In addition, the output of the blade 24, in accordance with the invention, is optimal, no matter what the direction of the water current in the longitudinal direction X, thanks to the flexibility of the thin part 44 which, by changing its shape, adapts to the direction of the water flow, thus enabling the blade 24 to present a profile whose outer surface EXT is optimal.

Figure 10:
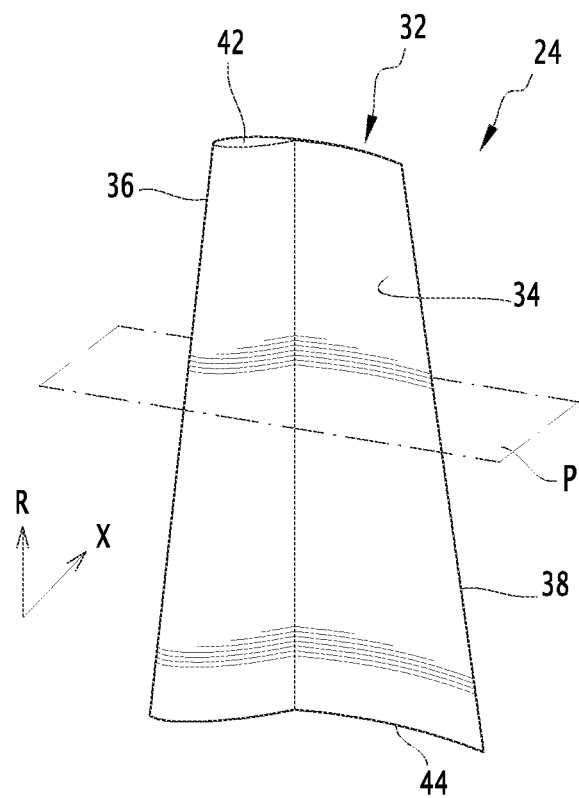
FIG. 10 is a similar view to that in FIG. 2 according to a second mode of embodiment of the invention.

FIG. 10 illustrates a second mode of embodiment of the invention, for which the elements that are similar to the first mode of embodiment, previously described, are designated by identical reference marks and are not described again.

According to the second mode of embodiment, the length C of the cord 46 between the leading edge 36 and the trailing edge 38 is variable depending on the position in the radial direction R of the cut plane P. Or, in other words, the profile 40 has a variable form depending on the position of the cut plane P in the radial direction R.

The length C preferably decreases from the inner ring 20 towards the outer ring 22.

Figure 4:
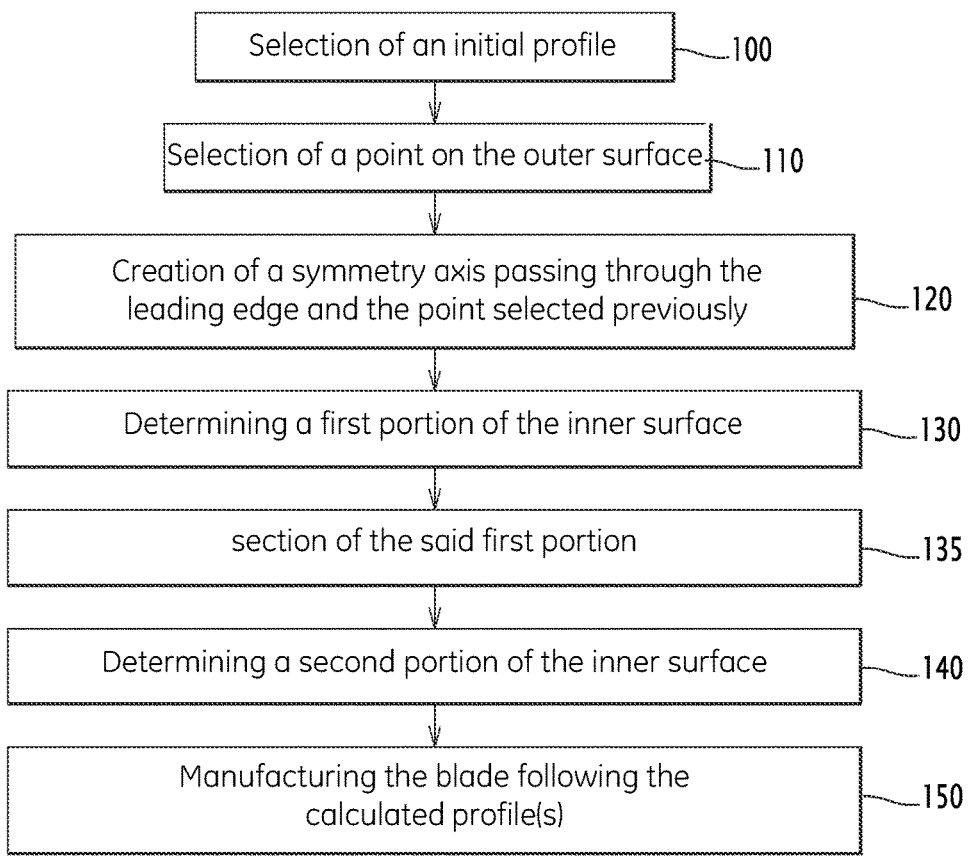
FIG. 4 is flow diagram of a process for manufacturing the blade from FIG. 2, FIGS. 5, 6, 7, 8, and 9 are schematic representations of a profile of the blade in the course of the steps of the manufacturing procedure in view of determining the profile of the blade.

The manufacturing procedure of the blade 24 is similar to the one described for the first embodiment mode with regard to FIG. 4 and, in addition, the steps 100 to 140 are reiterated in order to calculate the set of profiles 40 following the different cut planes P. The blade 24 is then manufactured from step 150 based on the different calculated profiles.

The functioning of this second mode of embodiment is identical to that of the first mode of embodiment and is not described again.

The advantages of this second mode of embodiment include those of the first mode of embodiment. The blades 24 with a variable profile along the cord C help, in addition, to even out the mechanical stresses in the blade 24 in the radial direction R.

Therefore, the blade 24, according to the invention, offers a higher output and enables the electric power delivered by the marine turbine 10 to be increased, according to the invention, for a wide range of rotation speeds of the rotor 14, such as speeds between 20 and 40 revolutions per minute, independently of the direction of the water current.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor for a marine turbine, the rotor comprising:
   an inner ring configured to revolve around a longitudinal axis, the inner ring having a first diameter;
   an outer ring configured to revolve around the longitudinal axis, the outer ring having a second diameter that is greater than the first diameter; and
   at least one blade extending in a radial direction between the inner ring and the outer ring, the at least one blade having a leading edge positioned upstream following a direction of the water flowing along the at least one blade, and a trailing edge positioned downstream following a direction of a flow of water along the blade, wherein at least one portion of the at least one blade, in a transverse section according to a cross-section thereof, has a profile with a thick part and a thin part, in which a length of a curve of the thin part is between 0.1 times a length of a cord between the leading edge and the trailing edge and 0.9 times the length of the cord inclusive, wherein a maximum thickness of the thick part is less than or equal to 0.25 times the length of the cord between the leading edge and the trailing edge, and the thick part has a plane of symmetry which is parallel to the radial direction such that respective curves of the outer surface and the inner surface of the thick part are symmetric along an entire length of the thick part.

2. The rotor of claim 1, wherein the at least one blade presents the thick part and the thin part independently of a position in the radial direction of the cross-section.

3. The rotor of claim 1, wherein the at least one blade presents a same profile independently of a position in the radial direction of the cross-section.

4. The rotor of claim 1, wherein the length of the cord between the leading edge and the trailing edge is variable depending on a position in the radial direction of the cross-section.

5. The rotor of claim 1, wherein the length of the cord between the leading edge and the trailing edge decreases from the inner ring towards the outer ring.

6. The rotor of claim 1, wherein the at least one blade comprises an inflexion point that corresponds approximately to a delimitation between the thick part and the thin part.

7. A rotor for a marine turbine, the rotor comprising:
   a first ring configured to revolve around an axis;
   a second ring configured to revolve around the axis, and which is concentrically arranged relative to the first ring; and
   at least one blade extending in a radial direction between the first ring and the second ring, the at least one blade having an outer surface, an inner surface, a leading edge, and a trailing edge,
   wherein at least one portion of the at least one blade presents, in a traverse section according to a cross-section, a profile with a first part having a first thickness in a direction perpendicular to the outer surface, and a second part having a second thickness in a direction perpendicular to the outer surface, the first thickness being at least four times greater than the second thickness, and a length of a curve of the second part is between 0.1 times a length of a cord between the leading edge and the trailing edge and 0.9 times the length of the cord inclusive, wherein the first thickness is less than or equal to 0.25 times the length of the cord between the leading edge and the trailing edge, and the second part has a plane of symmetry which is parallel to the radial direction such that respective curves of the outer surface and the inner surface of the second part are symmetric along an entire length of the second part.

8. The rotor of claim 7, wherein the at least one blade presents the first part and the second part independently of a position in the radial direction of the cross-section.

9. The rotor of claim 7, wherein the at least one blade presents a same profile independently of a position in the radial direction of the cross-section.

10. The rotor of claim 7, wherein the length of the cord between the leading edge and the trailing edge is variable depending on a position in the radial direction of the cross-section.

11. The rotor of claim 7, wherein the length of the cord between the leading edge and the trailing edge decreases from the inner ring towards the second ring.

12. The rotor of claim 7, wherein the at least one blade comprises an inflexion point that corresponds approximately to a delimitation between the first part and the second part.

* * * * *